(12) United States Patent
Wampler et al.

(10) Patent No.: US 8,763,665 B2
(45) Date of Patent: Jul. 1, 2014

(54) MODULAR HEAD AUTOMATED FABRIC LAMINATING APPARATUS

(75) Inventors: Robert Ray Wampler, August, KS (US); Matthew Ryan Schroeder, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 123 days.

(21) Appl. No.: 13/445,587

(22) Filed: Apr. 12, 2012

(65) Prior Publication Data

US 2012/0305175 A1 Dec. 6, 2012

Related U.S. Application Data

(60) Provisional application No. 61/496,374, filed on Jun. 13, 2011.

(51) Int. Cl.
*B29C 70/38* (2006.01)
*B65H 23/025* (2006.01)

(52) U.S. Cl.
USPC .......................... 156/494; 156/499; 156/510

(58) Field of Classification Search
CPC .. B29C 66/343; B29C 70/386; B29C 70/388; B29C 70/545; B65H 23/025; B65H 23/0251; B65H 23/0253; B65H 2301/512422
USPC .......... 156/229, 458, 494, 495, 496, 510, 499
See application file for complete search history.

(56) References Cited

U.S. PATENT DOCUMENTS

| 7,004,219 B2 * | 2/2006 | Nelson .......................... 156/538 |
| 2004/0166756 A1 * | 8/2004 | Kurihara et al. ............... 442/366 |
| 2006/0090856 A1 * | 5/2006 | Nelson et al. .................. 156/510 |
| 2006/0180264 A1 * | 8/2006 | Kisch et al. .................... 156/173 |
| 2008/0110548 A1 * | 5/2008 | Nelson et al. .................... 156/64 |
| 2009/0078361 A1 * | 3/2009 | Kisch et al. .................... 156/173 |
| 2011/0005456 A1 * | 1/2011 | Lizarralde Dorronsoro et al. ............................... 118/33 |

FOREIGN PATENT DOCUMENTS

DE 3914732 A1 * 10/1990

* cited by examiner

*Primary Examiner* — Michael Tolin
(74) *Attorney, Agent, or Firm* — Hovey Williams LLP

(57) ABSTRACT

An apparatus for laminating a fabric material to a part broadly comprises a vacuum table, a cutting element, a plurality of pinch rollers, and a plurality of compaction rollers. The vacuum table receives the fabric material from a supply spool and retains the material while the cutting element cuts scrap material from the sides of the fabric material. The pinch rollers receive the fabric material after the scrap material has been cut and are configured to stretch the fabric material from a center line outward toward the edges of the material. The compaction rollers receive the fabric material from the pinch rollers and are configured to press the fabric material against a surface of the part.

18 Claims, 4 Drawing Sheets

MODULAR HEAD AUTOMATED FABRIC LAMINATING APPARATUS

RELATED APPLICATION

The present application is a regular utility patent application and claims priority benefit, with regard to all common subject matter, of earlier-filed U.S. provisional patent application titled "MODULAR HEAD AUTOMATED FABRIC LAMINATING APPARATUS", Ser. No. 61/496,374, filed Jun. 13, 2011. The identified earlier-filed application is hereby incorporated by reference in its entirety into the present application.

BACKGROUND OF THE INVENTION

1. Field of the Invention

Embodiments of the present invention relate to machinery for applying a fabric to a composite material part.

2. Description of the Related Art

Composite material parts, such as those used to construct aircraft components, may include a plurality of layers that are stacked and cured to form a monolithic composite structure. Often, the first layer and/or the last layer of the material is a woven fabric. During application, or lamination, of the woven fabric to the rest of the composite material, the woven fabric may bunch or wrinkle instead of adhering smoothly. As a result, the finished composite structure may have an inner surface and/or an outer surface with defects or nonuniformities. Furthermore, the lamination has traditionally been performed manually in a time-consuming and labor-intensive process.

SUMMARY OF THE INVENTION

Embodiments of the present invention solve the above-mentioned problems and provide a distinct advance in the art of composite manufacturing techniques. More particularly, embodiments of the invention provide an automated apparatus and methods for applying a fabric material to a composite material part.

Embodiments of the apparatus broadly comprise a vacuum table, a cutting element, a plurality of pinch rollers, a heating element, and a plurality of compaction rollers. The vacuum table receives the fabric material from a supply spool and retains the material while the cutting element cuts scrap material from the sides of the fabric material. A scrap spool receives and retains the scrap material. The fabric material may also include a backing layer, which is removed from the fabric material and retained on a backing spool.

The pinch rollers receive the fabric material after the scrap material has been cut and are configured to stretch the fabric material from a center line outward toward the edges of the material. The pinch rollers may be positioned in a V formation with a first set of pinch rollers positioned on one side of the center line and a second set of pinch rollers positioned symmetrically to the first set on the opposite side of the center line. In addition, the pinch rollers may have a toe-out attitude such that the trailing edge of each roller is angled outward away from the center line.

The heating element may apply heat to the surface of the part before the fabric material is laminated to the part. The compaction rollers receive the fabric material from the pinch rollers and are configured to press the fabric material against a surface of the part. At least one of the compaction rollers includes a gas-fillable inner chamber and a gas-fillable surrounding outer chamber, such that the inner chamber is filled with higher pressure gas than the outer chamber.

Other embodiments of the invention include a method of laminating a fabric material to a part comprising the steps of: supplying fabric material, cutting scrap material from the edges of the fabric material, stretching the fabric material outward from a center line with a plurality of pinch rollers, and pressing the fabric material onto the part with at least one compaction roller.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
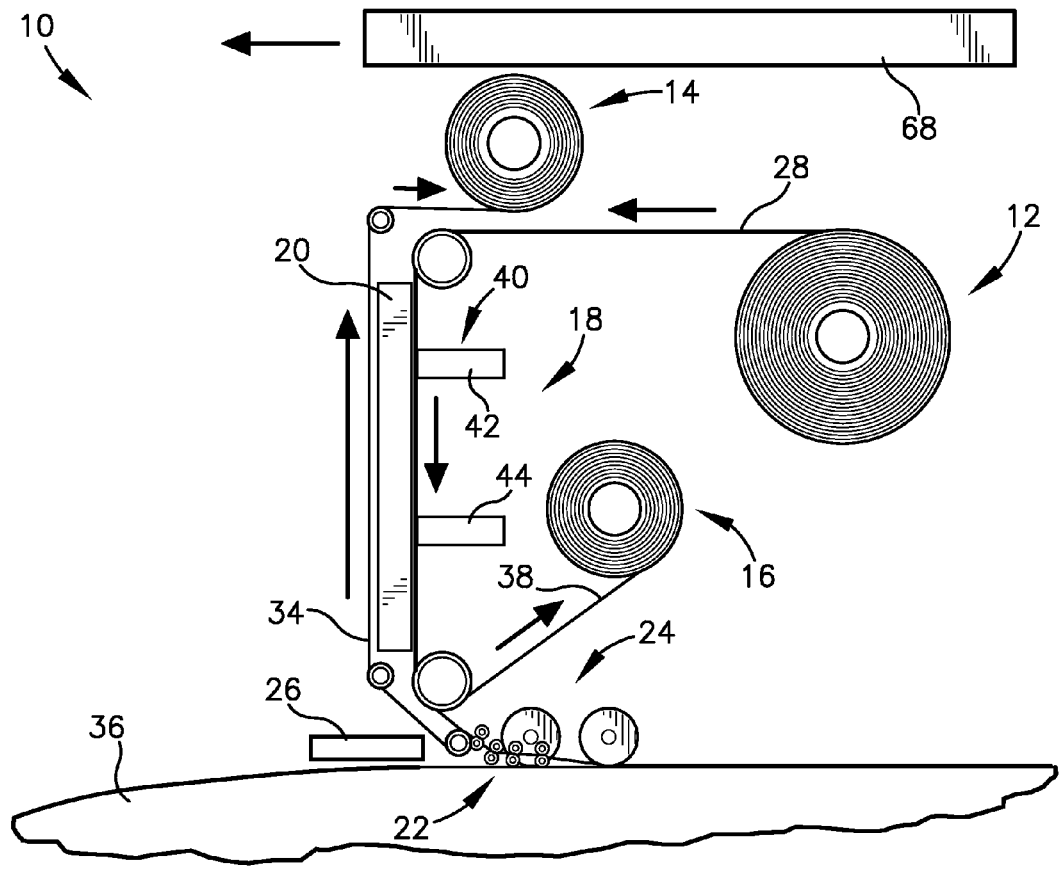
FIG. 1 is a side-view schematic diagram of an apparatus, constructed in accordance with various embodiments of the present invention, for laminating a fabric material to a part.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
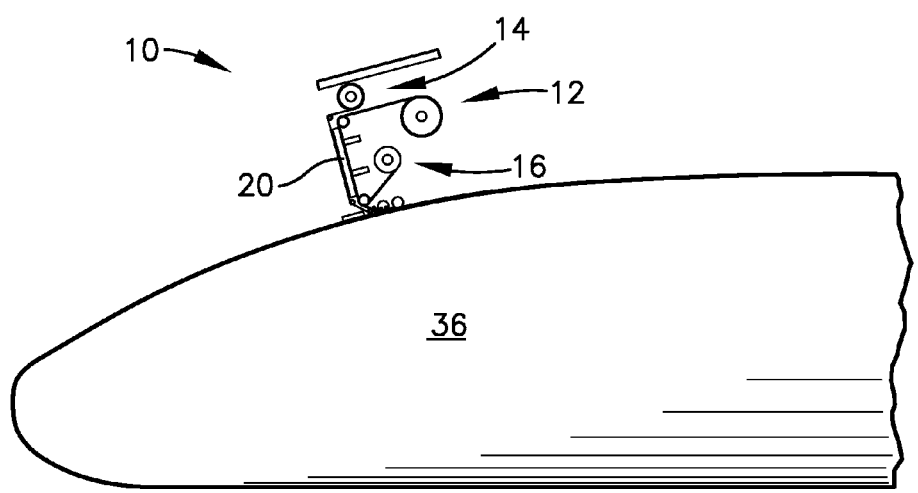
FIG. 2 is a side-view schematic diagram of the apparatus, zoomed out from the view of FIG. 1, depicting the apparatus laminating fabric material to an aircraft fuselage.

A modular head laminating apparatus 10 constructed in accordance with various embodiments of the current invention is shown in FIGS. 1 and 2. The apparatus 10 may broadly comprise a supply spool 12, a backing spool 14, a scrap spool 16, a cutting element 18, a vacuum table 20, a plurality of pinch rollers 22, a plurality of compaction rollers 24, and a heating element 26. The apparatus 10 may include additional components not shown in the figures or discussed in detail herein, such as supporting framework to hold the discussed components in position, motors or other drive mechanisms to move the components, controlling units to guide the operation of the apparatus 10, and the like.

The supply spool 12 may be of elongated cylindrical shape and configured to retain a fabric material 28 that has been rolled thereon. The fabric material 28 may be formed as an elongated sheet with an upper surface 30 and a lower surface 32. The fabric material 28 may further include a separable backing layer 34 adhered to the lower surface 32. An exemplary fabric material 28 may be inter-woven wire fabric. The fabric material 28 is generally applied or laminated to at least one surface of a composite material part 36. As an example, the fabric material 28 may be laminated to the inner surface, the outer surface, or both surfaces of composite material that forms an aircraft fuselage. The dimensions of the supply spool 12 may depend on the width of the fabric material 28, which may have an exemplary width of approximately 40 inches.

The term "downstream" may be used herein to describe the direction that the fabric material 28 flows as it moves from the supply spool 12 through the apparatus 10 and is applied to the composite material part 36.

The backing spool 14 may be of elongated cylindrical shape and configured to receive the backing layer 34 as the backing layer 34 is removed from the fabric material 28 during the lamination process.

The scrap spool 16 may be of elongated cylindrical shape and configured to receive scrap material 38 as the fabric material 28 is cut to remove unwanted material during the lamination process. The fabric material 28 may be cut, usually along the sides, in order to make the fabric material 28 the correct width to fit on to the composite material.

The cutting element 18 may include any common components, such as knives, blades, saws, or ultrasonic cutters, that are used for cutting material such as the fabric material 28. The cutting element 18 typically includes a pair of blades 40: a first blade 42 positioned near one side of the fabric material 28 and a second blade 44 positioned near the opposing side of the fabric material 28. The cutting element 18 may also include rails on which the blades 40 are mounted and which allow for adjustment of the position of the blades 40. The blades 40 generally cut the fabric material 28 along the sides to fit on to the composite material part 36.

The vacuum table 20 may be a table with a generally flat, rectangular upper surface 30 that is configured to receive the fabric material 28 as the material 28 is unrolled and streamed from the supply spool 12. The vacuum table 20 may include a suction source that is configured to pull the fabric material 28 against the upper surface 30. In various embodiments, the vacuum table 20 may be combined with the cutting element 18 as a single piece of equipment. An exemplary combination vacuum table 20 and cutting element 18 may be the AGFM US-30.

Figure 4:
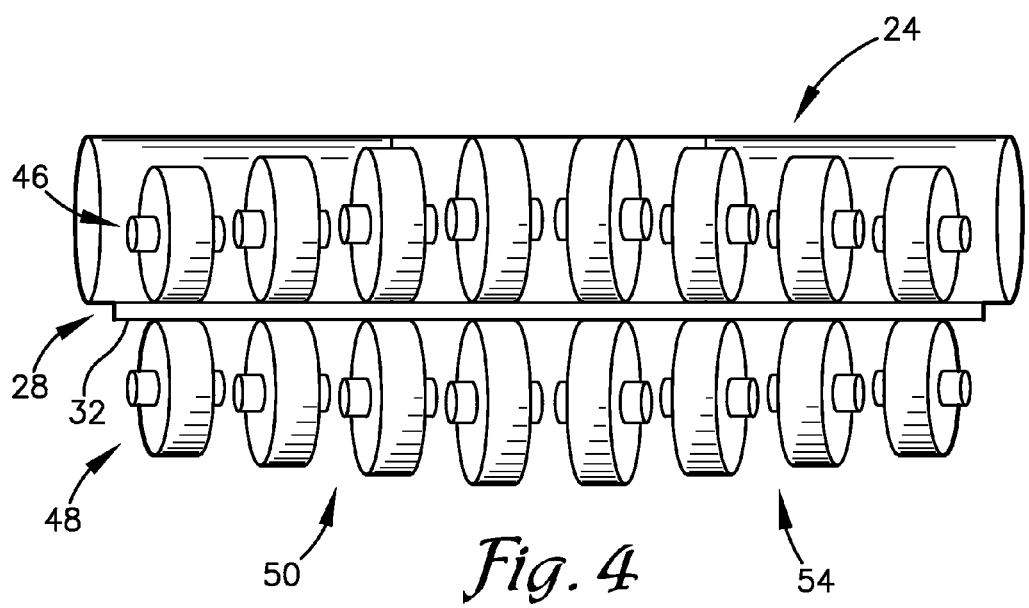
FIG. 4 is a front view of the pinch rollers and compaction rollers with the fabric material.

Each of the pinch rollers 22 may be of shortened cylindrical shape with an exemplary diameter of approximately 1 inch and able to rotate about a central axis. The pinch rollers 22 may include upper pinch rollers 46 and lower pinch rollers 48, such that the upper pinch rollers 46 are positioned to contact the upper surface 30 of the fabric material 28, while the lower pinch rollers 48 contact the lower surface 32, as seen in FIGS. 1 and 4. Furthermore, for every upper pinch roller 46 there is a corresponding lower pinch roller 48.

Figure 3:
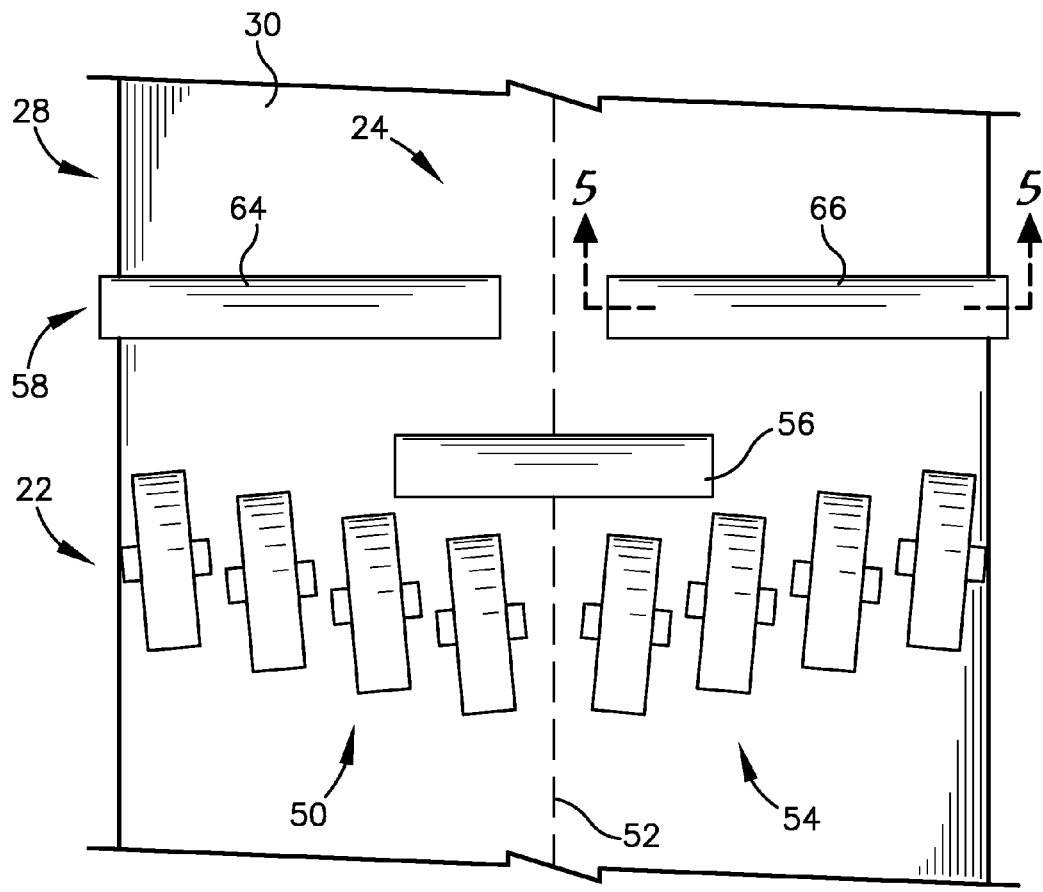
FIG. 3 is a top view of a portion of the apparatus depicting a plurality of pinch rollers and a plurality of compaction rollers with the fabric material.

The pinch rollers 22 may be arranged in a V-shaped formation with a first set 50 of rollers 22 positioned on one side of a center line 52 along the fabric material 28 and a second set 54 of rollers 22 positioned on the opposite side of the center line 52 such that the second set 54 is symmetric to the first set 50 about the center line 52, as seen in FIG. 3. Hence, when moving away from the center line 52 toward the edge of the fabric material 28, each roller 22 is spaced apart and positioned downstream from its adjacent roller 22.

In addition, each roller 22 of the first set 50 and the second set 54 may have a toe-out attitude such that the trailing edge of each roller 22 may be angled outward away from the center line 52. The angle at which the pinch rollers 22 toe outward may be adjustable. An exemplary embodiment of the apparatus 10 may include eight upper rollers 46 with four rollers in the first set 50 and four rollers in the second set 54, and eight lower rollers 48 with four rollers in the first set 50 and four rollers in the second set 54.

Given the rollers' V-shaped formation and the toe-out attitude, the pinch rollers 22 are configured to stretch and spread the fabric material 28 from the center to the edges to prevent wrinkling or bunching as the fabric material 28 is laminated to the composite material part 36.

Figure 5:
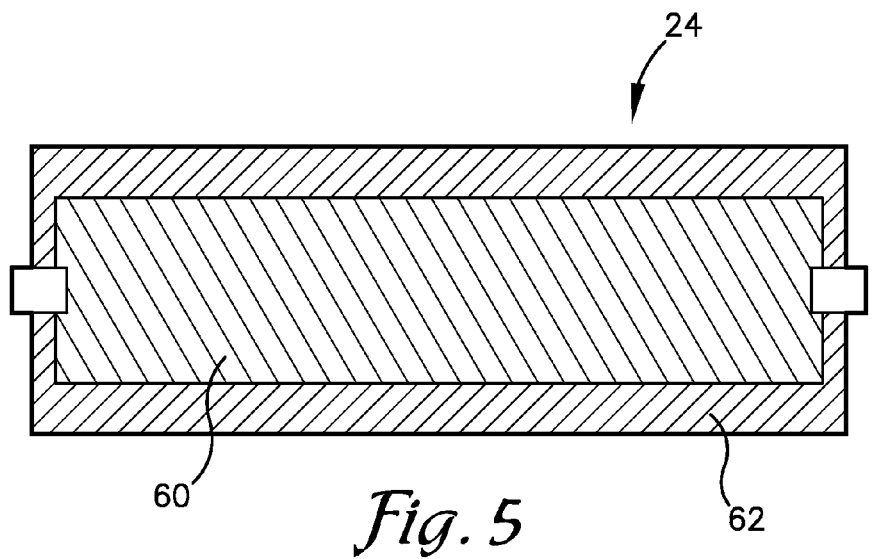
FIG. 5 is a sectional view of one of the compaction rollers depicting a two-chamber construction.
Figure 6:
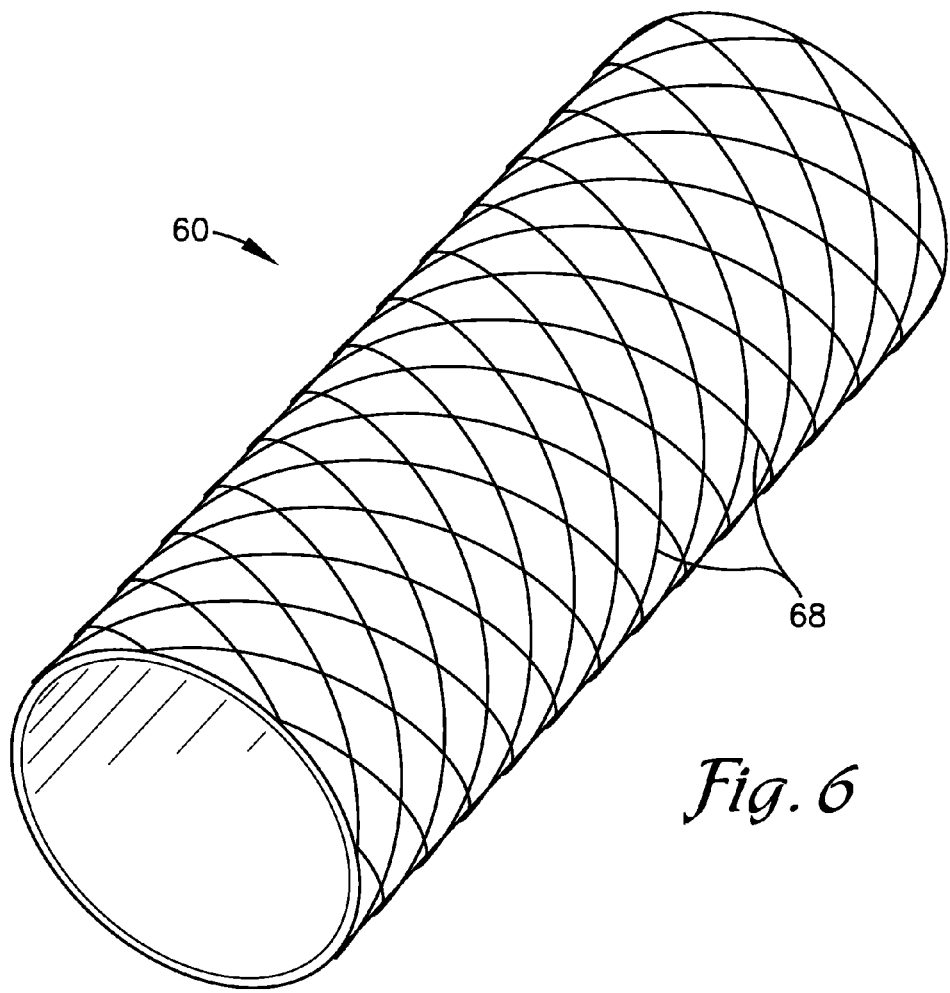
FIG. 6 is a perspective view of one of the compaction rollers, illustrating reinforcing bands.

The compaction rollers 24 may include a leading compaction roller 56 and a pair of trailing compaction rollers 58. The leading compaction roller 56 may be of elongated cylindrical shape and may be constructed from rigid material. The trailing compaction rollers 58 may be of elongated cylindrical shape and may have a two-chamber construction with an inner chamber 60 and an outer chamber 62, as shown in FIG. 5. The inner chamber 60 may include a gas fillable bladder. The outer chamber 62 may surround the inner chamber 60 and also include a gas fillable bladder. Generally, the inner chamber 60 is filled with a higher pressure gas than the outer chamber 62, such that the inner chamber 60 is relatively more rigid and the outer chamber 62 is relatively more pliable. The pressures and relative hardness of the inner chamber 60 and the outer chamber 62 may be adjusted as needed. In various embodiments, the inner chamber 60 may be reinforced with a plurality of bands 68, or cords, of a flexible, high tensile strength material like nylon or fiberglass woven into a mesh, or bias weave, that is oriented at an angle to the longitudinal axis of the inner chamber 60, as shown in FIG. 6. The reinforcing bands 68 help to maintain the rigidity of the inner chamber 60 as the pressure of the internal gas is increased.

The compaction rollers 24 are generally configured to apply pressure to the fabric material 28 as it is being laminated to the composite material part 36. Thus, the compaction rollers 24 are positioned to contact the upper surface 30 of the fabric material 28 while the lower surface 32 contacts and adheres to the composite material part 36. The leading compaction roller 56 may be positioned such that the center of the roller 56 is roughly aligned with the center line 52. The trailing compaction rollers 24 may include a first roller 64 and a second roller 66 that are spaced apart with the rotational axes of the rollers 58 being aligned. The trailing compaction rollers 58 may be positioned downstream from the leading compaction roller 56.

The heating element 26 may include any device or component capable of supplying thermal energy, such as coils or other resistive elements capable of carrying electric current, or the like. The heating element 26 may be positioned ahead of the pinch rollers 22 and the compaction rollers 24, and may direct energy onto the surface of the composite material part 36 such that the part 36 is heated when the fabric material 28 is laminated onto the part 36.

The apparatus 10, as seen in FIGS. 1 and 2, may operate as follows. Since the apparatus 10 may be used to laminate fabric material 28 to large composite material parts, such as an aircraft fuselage, various apparatus 10 components may be connected to a motion platform 68 that travels on a set of rails which may be elevated from the floor of a warehouse or hangar. Typically, the motion platform 68 holds the apparatus 10 above the highest point of the composite part 36. The motion platform 68 may guide and control the motion of the apparatus 10 during the lamination process. For example, as the fabric material 28 is being laminated to the surface of the composite material part 36, the motion platform 68 may generally move or propel the apparatus 10 forward such that the application of the fabric material 28 is a smooth and continuous process.

The direction of flow of various materials during the lamination process is indicated in FIG. 1 by the enlarged arrows. The supply spool 12 may retain the source fabric material 28, and by default, the backing layer 34. Some of the material 28 may be directed via an optional roller to the vacuum table 20, where the material 28 is guided past the cutting element 18. The first and second blades 42, 44 may trim off excess fabric material 28 (and the backing layer 34) or scrap material 38—usually along the sides, as the material 28 moves along the vacuum table 20. The fabric material 28 and the scrap material 38 may then be directed from the vacuum table 20, where the scrap material 38 is separated from the fabric material 28 and taken up by the scrap spool 16.

The backing layer 34 may then be peeled from the lower surface 32 of the fabric material 28. Through optional secondary rollers, the backing layer 34 may be directed to and taken up by the backing spool 14. The fabric material 28 may then be directed through the pinch rollers 22, where the material 28 is spread and stretched from the center to the edges by the V-shaped formation and the toe-out attitude of the pinch rollers 22, as seen in FIGS. 3 and 4.

With the fabric material 28 under lateral tension, it may be applied to the surface of the composite material part 36, first being pressed against the part 36 by the leading compaction roller 56 and then being pressed by the trailing compaction rollers 58. The leading compaction roller 56 may be constructed from generally uniform rigid material. The trailing compaction rollers 58 may be of two-chamber construction that can apply variable pressure to the fabric material 28 as it is being laminated to the composite material part 36. The trailing compaction rollers 58 may also be pliable or capable of being tilted or angled toward the edges of the fabric material 28 in order to press the material 28 onto a composite material part 36 surface that is curved about a longitudinal axis, such as with an aircraft fuselage. In addition, the surface of the composite material part 36 may be heated in advance by the heating element 26 so that the fabric material 28 may be laminated to a warm surface to improve adherence.

As the fabric material 28 is pressed onto the composite material part 36, the motion platform 68 may propel the apparatus 10 forward to provide smooth and continuous lamination of the fabric material 28. In the exemplary embodiment shown in FIGS. 1 and 2, the apparatus 10 is laminating fabric material 28 onto the outer surface of the fuselage from the rear to the front of the fuselage, with the motion platform 68 moving the apparatus 10 in the forward direction.

In other embodiments of the apparatus 10, the apparatus 10 components may remain relatively stationary while a motion control machine (not shown in the figures) moves or propels the composite material part 36 in order to continuously laminate the part 36.

Figure 7:
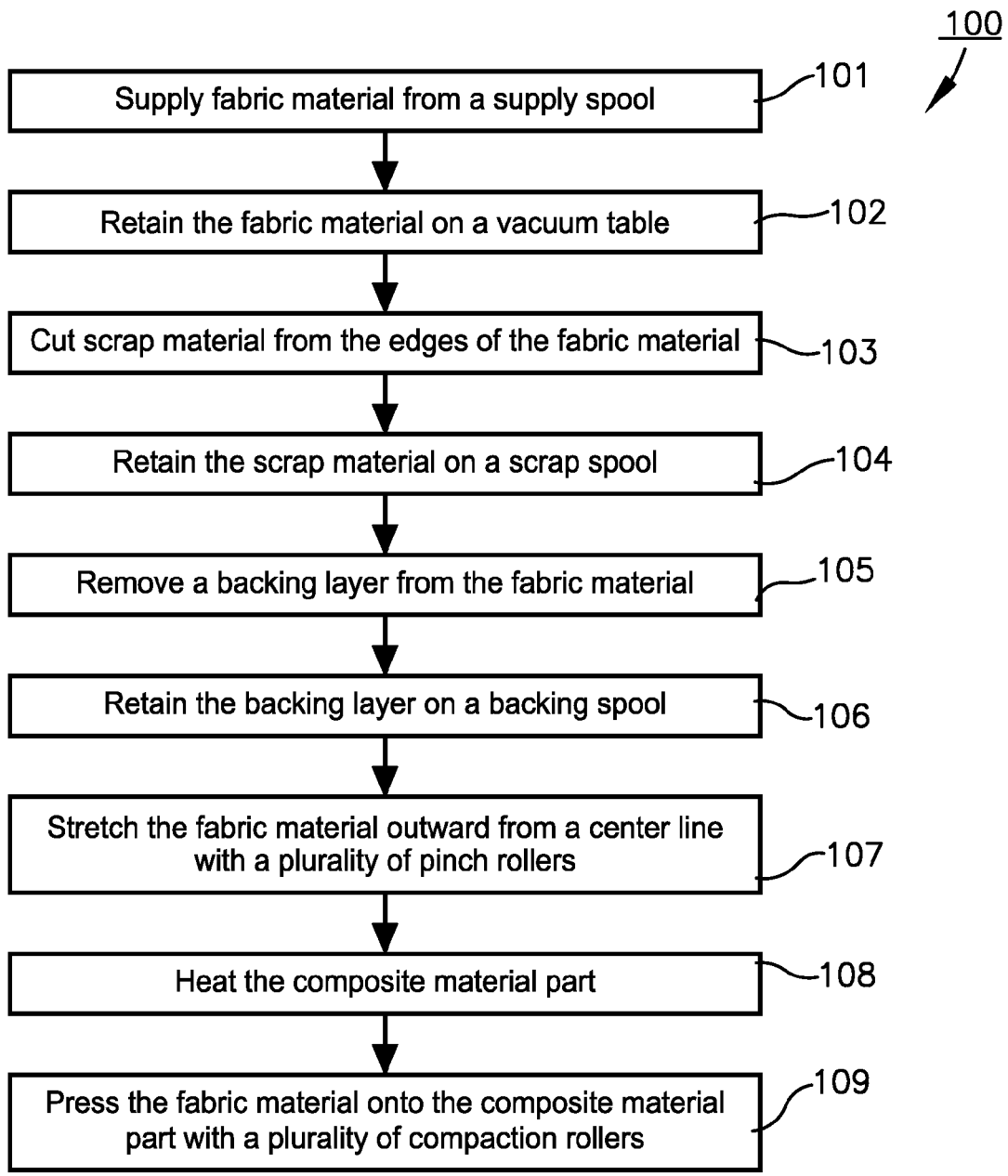
FIG. 7 is a flow diagram of at least a portion of the steps of a method of laminating the fabric material to the part.

Steps of a method 100 for laminating a fabric material 28 to a composite material part 36 in accordance with various embodiments of the present invention are illustrated in FIG. 7. The steps may be performed in the order shown in FIG. 7, or they may be performed in a different order. Furthermore, some steps may be performed concurrently as opposed to sequentially. In addition, some steps may be optional.

Referring to step 101, fabric material 28 is supplied from a supply spool 12. The fabric material 28 may be formed as an elongated sheet with an upper surface 30 and a lower surface 32, and may be rolled onto the supply spool 12.

Referring to step 102, the fabric material 28 is retained on a vacuum table 20. The fabric material 28 may be received in a stream from the supply spool 12.

Referring to step 103, scrap material 38 is cut from the edges of the fabric material 28. The scrap material 38 may be cut using a cutting element 18.

Referring to step 104, the scrap material 38 is retained on a scrap spool 16. The scrap material 38 is generally received from the vacuum table 20 and the cutting element 18.

Referring to step 105, a backing layer 34 is removed from the fabric material 28. The backing layer 34 is generally removed after the scrap material 38 has been cut.

Referring to step 106, the backing layer 34 is retained on a backing spool 14.

Referring to step 107, the fabric material 28 is stretched outward from a center line 52 with a plurality of pinch rollers 22. The pinch rollers 22 may include upper pinch rollers 46 and lower pinch rollers 48, between which the fabric material 28 may pass. The pinch rollers 22 may be positioned in a V formation with a first set 50 of pinch rollers 22 positioned on one side of the center line 52 and a second set 54 of pinch rollers 22 positioned symmetrically to the first set 50 on the opposite side of the center line 52. Furthermore, each pinch roller 22 is spaced apart and positioned downstream from its adjacent pinch roller 22 when moving from the center line to the edges of the fabric material 28. In addition, the pinch rollers 22 have a toe-out attitude such that the trailing edge of each roller 22 is angled outward away from the center line 52.

Referring to step 108, the composite material part 36 is heated. The thermal energy is generally supplied by a heating element 26.

Referring to step 109, the fabric material 28 is pressed onto the composite material part 36 with a plurality of compaction rollers 24. The compaction rollers 24 may contact the upper surface 30 of the fabric material 28 and press the fabric material 28 onto the composite material part 36. At least one of the compaction rollers 24 may be of two-chamber construction that can apply variable pressure to the fabric material 28 as it is being laminated to the composite material part 36.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An apparatus for laminating a fabric material to a part, the apparatus comprising:
   a plurality of pinch roller pairs configured to prevent wrinkling of the fabric material before the fabric material is applied to the part, wherein the fabric material is generally planar while it is in contact with any single pinch roller pair, the pinch roller pairs including a set of left pinch roller pairs comprising a plurality of left pinch roller pairs positioned on one side of a lateral center line of the fabric material, the left pinch roller pairs including a first left pinch roller pair positioned adjacent to the center line with each successive left pinch roller pair positioned downstream and laterally outward from the previous left pinch roller pair, and a set of right pinch roller pairs comprising a plurality of right pinch roller pairs positioned on the opposing side of the center line, the right pinch roller pairs including a first right pinch roller pair positioned adjacent to the center line with each successive right pinch roller pair positioned downstream and laterally outward from the previous right pinch roller pair; and
   at least one compaction roller configured to receive the fabric material from the pinch roller pairs and to press the fabric material against a surface of the part.

2. The apparatus of claim 1, wherein the pinch roller pairs have a toe-out attitude such that the trailing edge of each roller pair is angled outward away from the center line.

3. The apparatus of claim 1, wherein the at least one compaction roller includes a gas-fillable inner chamber and a gas-fillable surrounding outer chamber, such that the inner chamber is filled with higher pressure gas than the outer chamber.

4. The apparatus of claim 1, further including a vacuum table and a cutting element, wherein the vacuum table is configured to retain the fabric material while the cutting element cuts scrap material from the edges of the fabric material.

5. The apparatus of claim 4, further including a scrap spool configured to receive the scrap material from the vacuum table and cutting element.

6. The apparatus of claim 1, further including a heating element configured to heat the part before the fabric material is applied thereon.

7. The apparatus of claim 1, further including a supply spool configured to retain and supply the fabric material.

8. The apparatus of claim 1, further including a backing spool configured to receive a backing layer that is removed from the fabric material before the fabric material is applied to the part.

9. The apparatus of claim 1, wherein each pinch roller pair includes a first surface roller and an opposing second surface roller such that the first surface roller and the second surface roller have roughly the same diameter.

10. The apparatus of claim 1, wherein each pinch roller pair includes a first surface roller and an opposing second surface roller such that the first surface roller and the second surface roller have roughly the same width.

11. An apparatus for laminating a fabric material to a part, the apparatus comprising:
   a vacuum table and a cutting element, wherein the vacuum table is configured to retain the fabric material while the cutting element cuts scrap material from the edges of the fabric material;
   a plurality of pinch roller pairs configured to prevent wrinkling of the fabric material before the fabric material is applied to the part, wherein the fabric material is generally planar while it is in contact with any single pinch roller pair, the pinch roller pairs including a set of left pinch roller pairs comprising a plurality of left pinch roller pairs positioned on one side of a lateral center line of the fabric material, the left pinch roller pairs including a first left pinch roller pair positioned adjacent to the center line with each successive left pinch roller pair positioned downstream and laterally outward from the previous left pinch roller pair, and a set of right pinch roller pairs comprising a plurality of right pinch roller pairs positioned on the opposing side of the center line, the right pinch roller pairs including a first right pinch roller pair positioned adjacent to the center line with each successive right pinch roller pair positioned downstream and laterally outward from the previous right pinch roller pair; and
   at least one compaction roller configured to receive the fabric material from the pinch roller pairs and to press the fabric material against a surface of the part.

12. The apparatus of claim 11, wherein the pinch roller pairs have a toe-out attitude such that the trailing edge of each roller pair is angled outward away from the center line.

13. The apparatus of claim 11, wherein the at least one compaction roller includes a reinforced gas-fillable inner chamber whose rigidity can be varied by varying the inner chamber air pressure, the inner chamber supporting a compliant and gas-fillable surrounding outer chamber.

14. The apparatus of claim 11, further including a heating element configured to heat the part before the fabric material is applied thereon.

15. The apparatus of claim 11, further including a backing spool configured to receive a backing layer that is removed from the fabric material before the fabric material is applied to the part.

16. The apparatus of claim 11, wherein each pinch roller pair includes a first surface roller and an opposing second surface roller such that the first surface roller and the second surface roller have roughly the same diameter.

17. The apparatus of claim 11, wherein each pinch roller pair includes a first surface roller and an opposing second surface roller such that the first surface roller and the second surface roller have roughly the same width.

18. An apparatus for laminating a fabric material to a part, the apparatus comprising:
   a vacuum table and a cutting element, wherein the vacuum table is configured to retain the fabric material while the cutting element cuts scrap material from the edges of the fabric material;
   a plurality of pinch rollers configured to receive the fabric material from the vacuum table and cutting element and to prevent wrinkling of the fabric material before the fabric material is applied to the part, wherein—
      the pinch rollers are positioned in a V formation with a first set of pinch rollers positioned on one side of a center line of the fabric material and a second set of pinch rollers positioned symmetrically to the first set on the opposite side of the center line,
      the pinch rollers have a toe-out attitude such that the trailing edge of each roller is angled outward away from the center line, and
      each pinch roller is spaced apart and positioned downstream from its adjacent pinch roller when moving from the center line to the edges of the fabric material;
   a backing spool configured to receive a backing layer that is removed from the fabric material before the fabric material is received by the pinch rollers;

at least one compaction roller configured to receive the fabric material from the pinch rollers and to press the fabric material against a surface of the part, wherein the at least one compaction roller includes a gas-fillable inner chamber and a gas-fillable surrounding outer chamber, such that the inner chamber is filled with higher pressure gas than the outer chamber; and a heating element configured to heat the part before the at least one compaction roller presses the fabric material against the part.

\* \* \* \* \*